United States Patent

[11] 3,571,565

| | | |
|---|---|---|
| [72] | Inventor | **Brian Edward Hasler**<br>**Neuchatel, Switzerland** |
| [21] | Appl. No. | **791,227** |
| [22] | Filed | **Jan. 15, 1969** |
| [45] | Patented | **Mar. 23, 1971** |
| [73] | Assignee | **Ebauches S.A., Neuchatel**<br>**Canton of Neuchatel, Switzerland** |
| [32] | Priority | **Jan. 19, 1968** |
| [33] | | **Switzerland** |
| [31] | | **885/68** |

[54] ELECTRONIC THERMOSTAT
6 Claims, 4 Drawing Figs.

[52] U.S. Cl. .......... 219/501
[51] Int. Cl. .......... H05b 1/02
[50] Field of Search .......... 219/501, 499, 505, 504

[56] References Cited

UNITED STATES PATENTS 3,275,802 9/1966 Vandivere et al. .......... 219/499

OTHER REFERENCES

GE Transistor Manual 7th Edition Pages 404—405

*Primary Examiner*—G. Harris
*Assistant Examiner*—F. E. Bell
*Attorney*—Imirie & Smiley

ABSTRACT: An electronic thermostat having a thermosensitive semiconductor element in its measuring circuit, the hysteresis of the thermostat being substantially reduced by pulsating or alternating signals in said semiconductor element.

INVENTOR
BRIAN E. HASLER

ELECTRONIC THERMOSTAT

This invention relates to an electronic thermostat having a measuring circuit including a thermosensitive element and a heating element controlled by the measuring circuit.

In prior electronic thermostats classical thermosensitive elements are used either in voltage dividers or in bridge circuits, the output signal of the voltage divider or of the bridge being amplified for control of the heating element. In many applications the output signal of the voltage divider or bridge is used for control of a trigger, the heating element being connected to the trigger output. The trigger may be constituted by a controllable rectifier or thyristor.

All these electronic thermostats are either relatively complicated and expensive or they have little sensitivity or high hysteresis.

This invention aims in providing an electronic thermostat of simple design and having performances exceeding those of the above prior circuits. The thermostat according to this invention broadly comprises a measuring circuit, a thermosensitive controllable semiconductor element having a negative resistance characteristic in said measuring circuit, and a heating element controllable by said measuring circuit, said thermosensitive element being mounted in a circuit adapted for pulsating operation. Preferably a controllable rectifier or thyristor is used as a thermosensitive element, but transistors or other semiconductor elements may be used in other applications.

This invention will now be explained in detail with reference to the drawing, wherein.

Figure 1:
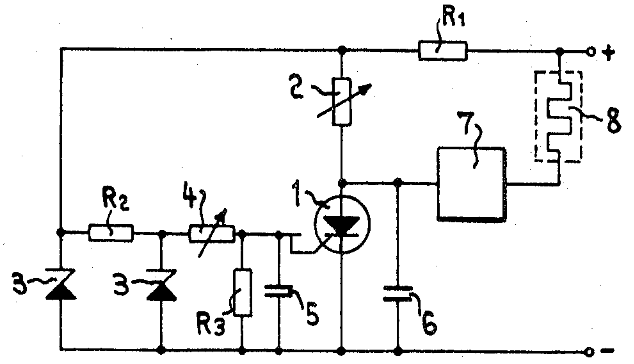
FIG. 1 is a circuit diagram of a first embodiment.
Figure 2:
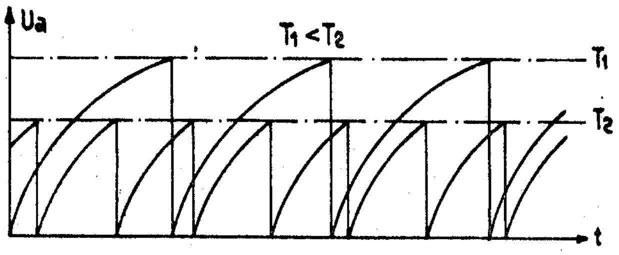
FIG. 2 is a diagram for explanation of the operation of the first embodiment.

The thermostat illustrated in FIG. 1 has a controllable rectifier or thyristor 1, energized from a direct voltage source through a resistor 2 connected into the anode circuit of the rectifier 1. The control electrode of rectifier 1 is maintained at a slightly positive constant potential relatively to its cathode by means of a circuit including Zener diodes 3 for stabilisating purposes, a potentiometer 4 for adjusting the bias voltage and a condenser 5 connected between the control electrode or grid and the cathode of the rectifier. A charging condenser 6 is connected between the anode and the cathode of rectifier 1. The anode of rectifier 1 is further connected to the input of a power amplifier 7. A heating resistor 8 is connected to the output of amplifier 7.

As set out above, the control electrode of the rectifier 1 is maintained at a slightly positive bias potential relatively to the cathode of the rectifier, so that current is conducted by the rectifier when the anode potential reaches a sufficient value for ignition of the rectifier. Upon ignition of the rectifier its resistance falls to a practically insignificant value so that the anode potential of the rectifier falls practically to zero. At this moment, the rectifier is cut off because the anode current is no longer sufficient for maintaining conduction of the rectifier. The condenser 6 which had been discharged by the conduction of rectifier 1 is now charged again through resistor 2 until the anode potential of rectifier 1 again reaches a value sufficient for ignition of rectifier 1. Therefore, the rectifier 1 with resistor 2 and condenser 6 form a relaxation circuit producing a self-sustained relaxation oscillation of a given amplitude. Since the ignition potential of rectifier 1 at a predetermined bias potential of the grid depends on the temperature, the amplitude of said oscillation changes with the temperature. Two oscillations of different amplitudes are shown for temperatures $T_1$ and $T_2$ where $T_1$ is lower than $T_2$. Since the ignition point of the rectifier is higher for lower temperatures, an oscillation of higher amplitude is obtained for the lower temperature, and consequently a higher heating power is obtained at the output of amplifier 7 for lower temperatures. When resistor 8 and rectifier 1 are accommodated in a common enclosure, the temperature in this enclosure is maintained at a precise value. With a test circuit oscillating at a frequency in the order of 100 c.s. a temperature difference of 1/10° C. was measured in the enclosure for a variation of the ambient temperature of − 20° to + 75° C. The temperature of the thermostat may be adjusted by means of the potentiometer 4 because the anode voltage at which the rectifier 1 is ignited at a given temperature depends on the bias voltage and bias current in the grid-cathode stretch of the rectifier. For proper operation of the circuit the anode current of the rectifier 1 should fall below the extinguishing value. Potentiometer 2 allows adjustment of this condition.

The elements of the circuit shown in FIG. 1 may be as follows:

| | |
|---|---|
| Operating voltage | 12 V |
| Resistor $R_1$ | 1.5 kohms |
| Resistor $R_2$ | 680 ohms |
| Resistor 2 | 100 kohms |
| Resistor 4 | 100 kohms |
| Resistor $R_3$ | 10 kohms |
| Diodes 3 | ZF 6.2 / ZF 9.1 |
| Condensers 5 and 6 | 1. $\mu$F |
| Rectifier 1 | TIC 45 |

The circuit of FIG. 1 may operate under on-off condition when condenser 6 is omitted, in which case the power consumed by amplifier 7 may be reduced. When, under these circumstances, the rectifier is connected to the direct voltage source of proper voltage, it will be ignited at a predetermined temperature above a second temperature at which it will be cut off again. The mean temperature of the enclosure containing resistor 8 and rectifier 1 substantially depends on the current in the control electrode and to a smaller degree from the anode current. The hysteresis, that is the difference between the ignition temperature and cutoff temperature, depends principally from the anode current and to a smaller degree from the current at the control electrode. In this case the circuit operates in on-off condition as is usual for thermostats, the changeover frequency being determined by the thermic values. A direct current amplifier may be used for energizing the heating resistor 8. The hysteresis of this circuit may be reduced by a factor in the order of 40 by the effect of condenser 5 between the control electrode and the cathode. This reduction and the corresponding reduction of the temperature fluctuations in the enclosure are due to a relaxation oscillation set up at the control electrode as soon as the rectifier is ignited. By this relaxation oscillation the voltage at the control electrode is periodically reduced whereby cutoff of the rectifier is assisted.

However, as long as the lowest peaks of the voltage at the control electrode do not attain the extinguishing voltage, the anode current is not influenced by the relaxation oscillation at the control electrode, that is the rectifier always remains in conducting condition. In other language, the on-off operation is not affected by the said relaxation oscillation, but the hysteresis is substantially reduced.

By proper choice of the elements and operating conditions in the above circuit, wherein condenser 6 is omitted, the hysteresis has been reduced from 4 to 0.1° C. in a practical case. This value is a fifth of the values obtained with a bimetal-controlled switch. Therefore, this circuit has at the same time the small power consumption of an on-off system and a very small hysteresis approaching performances of a proportional thermostat.

Figure 3:
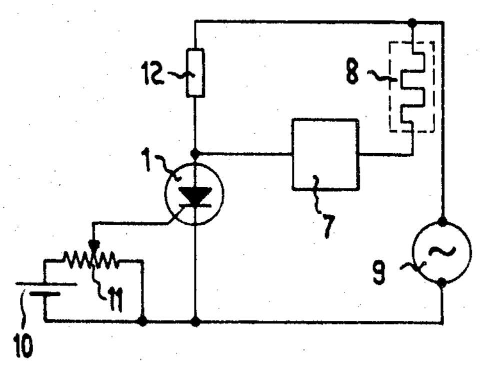
FIG. 3 is a circuit diagram of a second embodiment.

Instead of direct current operation, alternating current operation is possible and may be advantageous. The diagram of a simple thermostat for alternating current operation is shown in FIG. 3. The circuit is energized by an alternating voltage source 9. Proper biasing of the control electrode of rectifier 1 is produced by means of a direct voltage source 10 and of a potentiometer 11. A load resistance 12 is connected into the anode circuit of rectifier 1.

Figure 4:
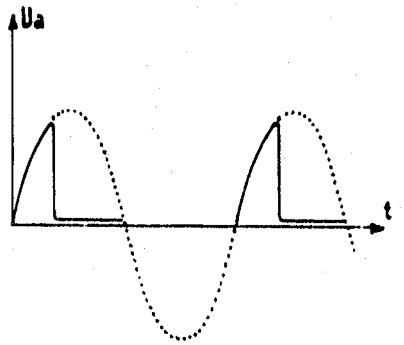
FIG. 4 is a diagram for explaining the operation of the second embodiment.

As explained above in connection with FIG. 1, the rectifier is ignited at an anode voltage depending on the temperature of the rectifier. This results in a voltage at the anode of rectifier 1 as shown in FIG. 4. No current flows for the negative alternances of the voltage. During the positive alternances of the operating voltage, the rectifier remains first cut off and the anode voltage increases in accordance with the voltage of source 9. At a predetermined anode voltage depending on the temperature, the rectifier is ignited and the anode voltage falls to an insignificant value just sufficient for sustaining conduction of the rectifier. The anode current then falls to zero when the operating voltage passes through zero towards negative values. The voltage pulses appearing at the anode of rectifier 1 are amplified by amplifier 7 so that the heating resistor 8 dissipates more power for low temperatures than for higher temperatures. A highly efficient temperature control is obtained in this way practically without hysteresis.

I claim:

1. An electronic thermostat comprising a measuring circuit, a thermosensitive controllable rectifier having a negative resistance characteristic in said measuring circuit, a current-limiting resistor connected to the anode of said controllable rectifier, a bias circuit for the control electrode of said controllable rectifier for providing a constant direct current bias between said control electrode and cathode of the controllable rectifier, condenser means connected directly between electrodes of said controllable rectifier for setting up a relaxation oscillation between the electrodes bridged by said condenser, and heating means controllable by said measuring circuit.

2. A thermostat according to claim 1, wherein a condenser is connected between the anode and cathode of the controllable rectifier.

3. A thermostat according to claim 1, wherein the controllable semiconductor element is connected to an alternating voltage source.

4. A thermostat according to claim 3, wherein a resistor is connected between the anode of the rectifier and the alternating voltage source, the input of a control circuit for the heating element being connected to the anode of the rectifier.

5. A thermostat according to claim 1, wherein a condenser is connected between the control electrode and the cathode of the controllable rectifier.

6. An electronic thermostat comprising a measuring circuit including a voltage source connected to the anode-cathode circuit of a controllable rectifier and current-limiting resistor means connected between the anode of said controllable rectifier and said voltage source, a bias circuit providing constant bias potential between the cathode and control electrode of said controlled rectifier, resistor means between said bias circuit and control electrode and a condenser connected directly between the control electrode and cathode of said controllable rectifier, a relaxation oscillation being set up between the control electrode and cathode of the controllable rectifier due to said resistor means and condenser whereby the on-off hysteresis of the measuring circuit is substantially reduced.